United States Patent [19]
Baekkelund

[11] Patent Number: 5,819,757
[45] Date of Patent: Oct. 13, 1998

[54] ANIMAL NAIL FILING DEVICE

[76] Inventor: Peter F. Baekkelund, P.O. Box 60478, San Diego, Calif. 92166

[21] Appl. No.: 22,569

[22] Filed: Feb. 12, 1998

[51] Int. Cl.$^6$ ..................................................... A45D 29/05
[52] U.S. Cl. ........................ 132/73.6; 132/75.6; 132/75.8
[58] Field of Search .................................. 132/73.6, 75.6, 132/76.4, 75.8; 451/355, 296, 303, 311, 461, 241

[56] References Cited

U.S. PATENT DOCUMENTS

| | | | |
|---|---|---|---|
| 4,016,890 | 4/1977 | Fiorenza, Sr. et al. | 132/75.6 |
| 4,117,854 | 10/1978 | Rosenbloom | 132/75.8 |
| 4,683,897 | 8/1987 | McBride | 132/73.6 |
| 4,753,253 | 6/1988 | Hutson | 132/73.6 |
| 4,896,684 | 1/1990 | Chou | 132/75.6 |
| 5,033,485 | 7/1991 | Hauerwas et al. | 132/73.6 |

*Primary Examiner*—Gene Mancene
*Assistant Examiner*—Pedro Philogene

[57] ABSTRACT

A new animal nail filing device for gently and safely filing the claws of a pet. The inventive device includes a housing having an interior, a main portion, and a handle portion. The main portion has a generally flat top and proximal and distal ends. The top has an opening into the interior of the housing and is positioned towards the proximal end of the main portion. A grinding drum with an abrasive exterior surface for grinding the nail of an animal is rotatably mounted within the interior of the housing. The grinding drum is positioned within the main portion so that it is located adjacent the opening of the top of the main portion such that a nail of an animal may be extended through the opening to abut the abrasive exterior surface of the grinding drum. A motor is provided within the interior of the housing, the motor is operative connected to the grinding drum to permit rotation of the grinding drum by the motor. The handle portion has a trigger actuator switch that is operatively connected to the motor.

9 Claims, 3 Drawing Sheets

ANIMAL NAIL FILING DEVICE

BACKGROUND OF THE INVENTION

1. Field of the Invention

The present invention relates to pet grooming devices and more particularly pertains to a new animal nail filing device for gently and safely filing the claws of a pet.

2. Description of the Prior Art

The use of pet grooming devices is known in the prior art. More specifically, pet grooming devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art pet grooming devices include U.S. Pat. No. 4,117,854; U.S. Pat. No. 4,753,253; U.S. Pat. No. 5,033,485; U.S. Pat. No. 4,683,897; U.S. Pat. No. Des. 347,087; and U.S. Pat. No. 5,161,552.

While these devices fulfill their respective, particular objectives and requirements, the aforementioned patents do not disclose a new animal nail filing device. The inventive device includes a housing having an interior, a main portion, and a handle portion. The main portion has a generally flat top and proximal and distal ends. The top has an opening into the interior of the housing and is positioned towards the proximal end of the main portion. A grinding drum with an abrasive exterior surface for grinding the nail of an animal is rotatably mounted within the interior of the housing. The grinding drum is positioned within the main portion so that it is located adjacent the opening of the top of the main portion such that a nail of an animal may be extended through the opening to abut the abrasive exterior surface of the grinding drum. A motor is provided within the interior of the housing, the motor is operative connected to the grinding drum to permit rotation of the grinding drum by the motor. The handle portion has a trigger actuator switch that is operatively connected to the motor.

In these respects, the animal nail filing device according to the present invention substantially departs from the conventional concepts and designs of the prior art, and in so doing provides an apparatus primarily developed for the purpose of gently and safely filing the claws of a pet.

SUMMARY OF THE INVENTION

In view of the foregoing disadvantages inherent in the known types of pet grooming devices now present in the prior art, the present invention provides a new animal nail filing device construction wherein the same can be utilized for gently and safely filing the claws of a pet.

The general purpose of the present invention, which will be described subsequently in greater detail, is to provide a new animal nail filing device apparatus and method which has many of the advantages of the pet grooming devices mentioned heretofore and many novel features that result in a new animal nail filing device which is not anticipated, rendered obvious, suggested, or even implied by any of the prior art pet grooming devices, either alone or in any combination thereof.

To attain this, the present invention generally comprises a housing having an interior, a main portion, and a handle portion. The main portion has a generally flat top and proximal and distal ends. The top has an opening into the interior of the housing and is positioned towards the proximal end of the main portion. A grinding drum with an abrasive exterior surface for grinding the nail of an animal is rotatably mounted within the interior of the housing. The grinding drum is positioned within the main portion so that it is located adjacent the opening of the top of the main portion such that a nail of an animal may be extended through the opening to abut the abrasive exterior surface of the grinding drum. A motor is provided within the interior of the housing, the motor is operative connected to the grinding drum to permit rotation of the grinding drum by the motor. The handle portion has a trigger actuator switch that is operatively connected to the motor.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new animal nail filing device apparatus and method which has many of the advantages of the pet grooming devices mentioned heretofore and many novel features that result in a new animal nail filing device which is not anticipated, rendered obvious, suggested, or even implied by any of the prior art pet grooming devices, either alone or in any combination thereof.

It is another object of the present invention to provide a new animal nail filing device which may be easily and efficiently manufactured and marketed.

It is a further object of the present invention to provide a new animal nail filing device which is of a durable and reliable construction.

An even further object of the present invention is to provide a new animal nail filing device which is susceptible of a low cost of manufacture with regard to both materials and labor, and which accordingly is then susceptible of low prices of sale to the consuming public, thereby making such animal nail filing device economically available to the buying public.

Still yet another object of the present invention is to provide a new animal nail filing device which provides in the apparatuses and methods of the prior art some of the advantages thereof, while simultaneously overcoming some of the disadvantages normally associated therewith.

Still another object of the present invention is to provide a new animal nail filing device for gently and safely filing the claws of a pet.

Yet another object of the present invention is to provide a new animal nail filing device which includes a housing having an interior, a main portion, and a handle portion. The main portion has a generally flat top and proximal and distal ends. The top has an opening into the interior of the housing and is positioned towards the proximal end of the main portion. A grinding drum with an abrasive exterior surface for grinding the nail of an animal is rotatably mounted within the interior of the housing. The grinding drum is positioned within the main portion so that it is located adjacent the opening of the top of the main portion such that a nail of an animal may be extended through the opening to abut the abrasive exterior surface of the grinding drum. A motor is provided within the interior of the housing, the motor is operative connected to the grinding drum to permit rotation of the grinding drum by the motor. The handle portion has a trigger actuator switch that is operatively connected to the motor.

Still yet another object of the present invention is to provide a new animal nail filing device that is hand held for helping easy use that eliminates the need for awkward manual type nail clippers.

Even still another object of the present invention is to provide a new animal nail filing device that reduces the risk of cutting into sensitive blood vessels when trimming a pet's nails.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
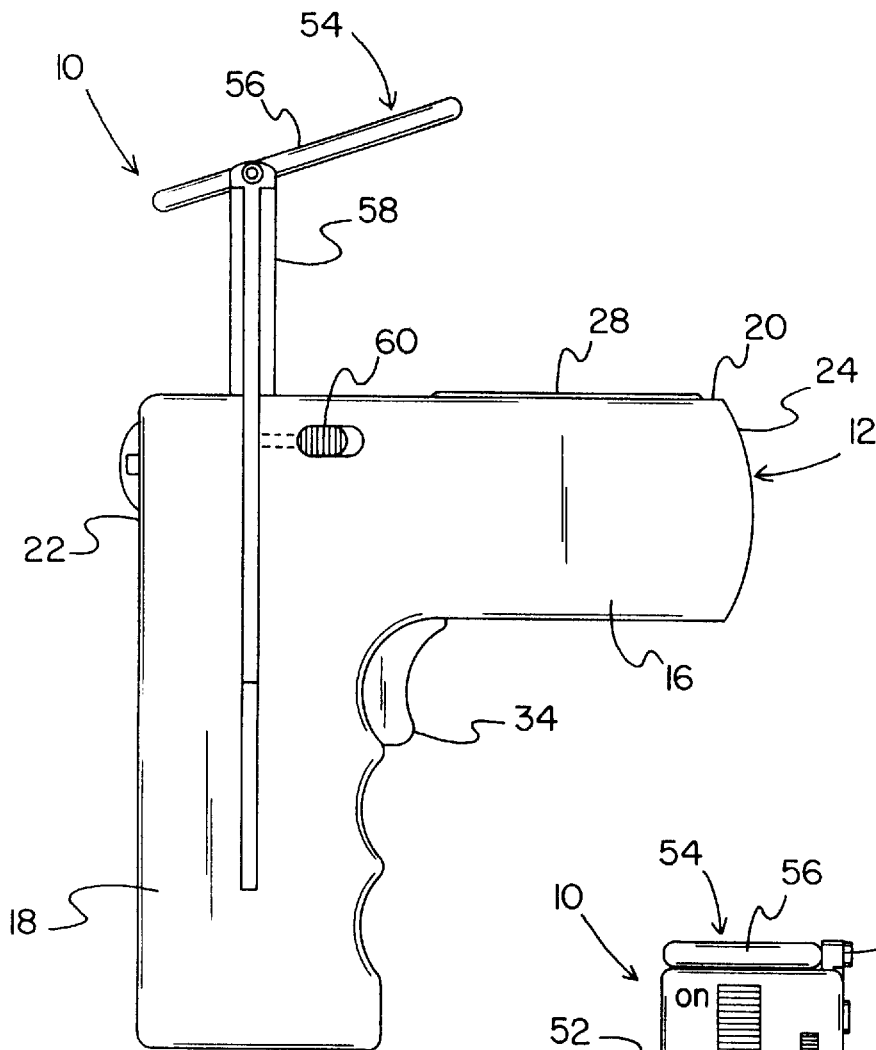
FIG. 1 is a schematic right side view of a new animal nail filing device according to the present invention.
Figure 2:
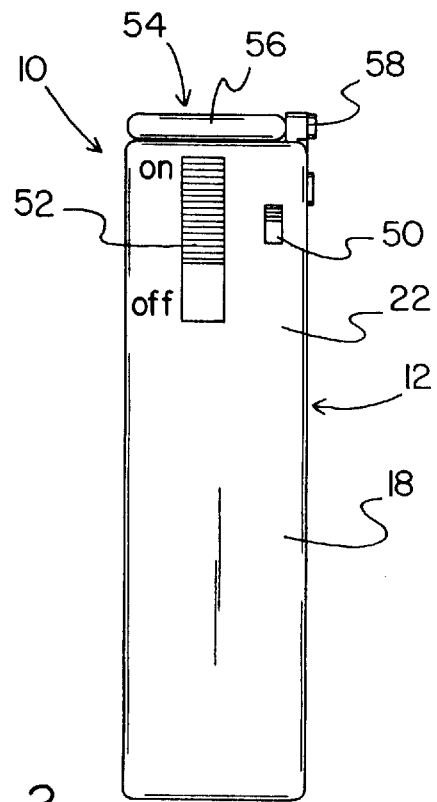
FIG. 2 is a schematic side view of the proximal end of the present invention.
Figure 3:
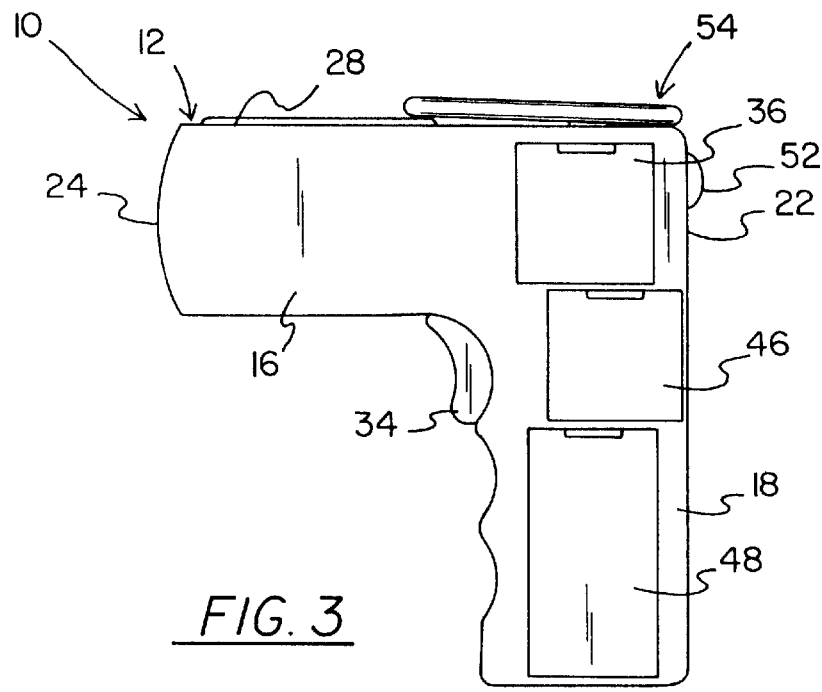
FIG. 3 is a schematic left side view of the present invention.
Figure 4:
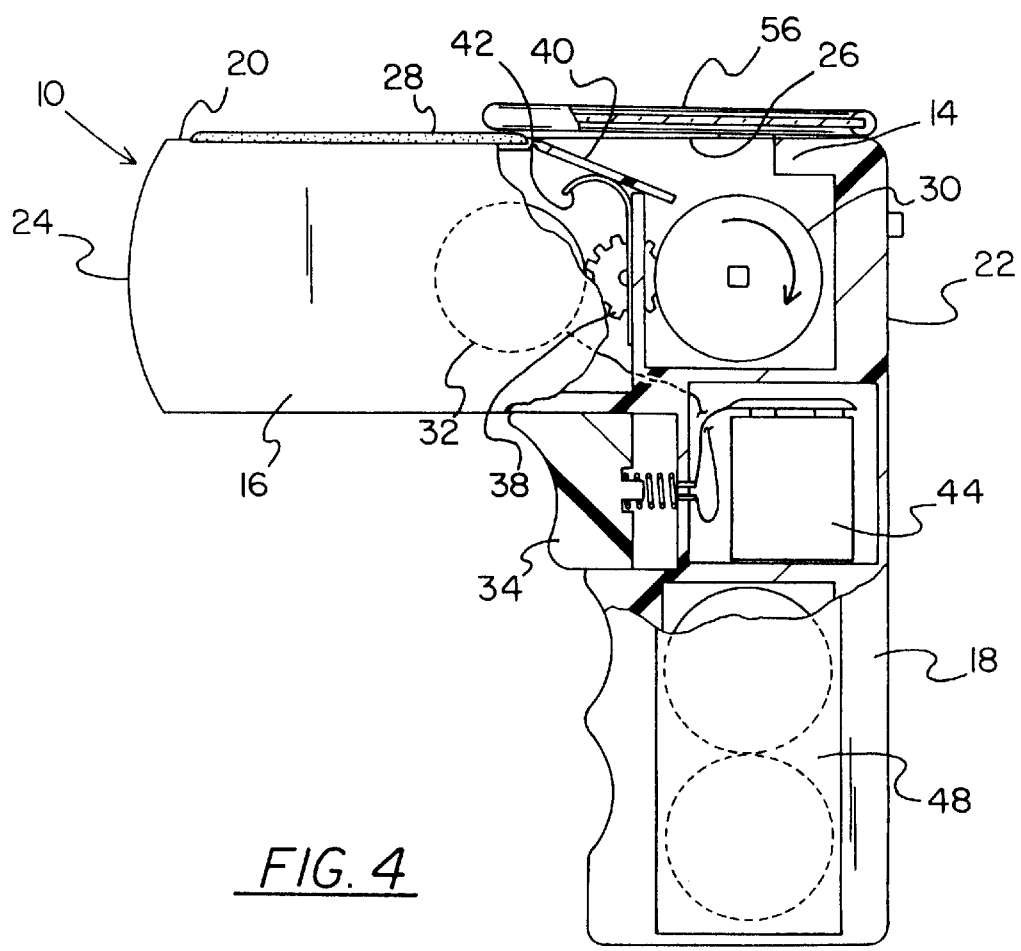
FIG. 4 is a schematic breakaway left side view of the present invention.
Figure 5:
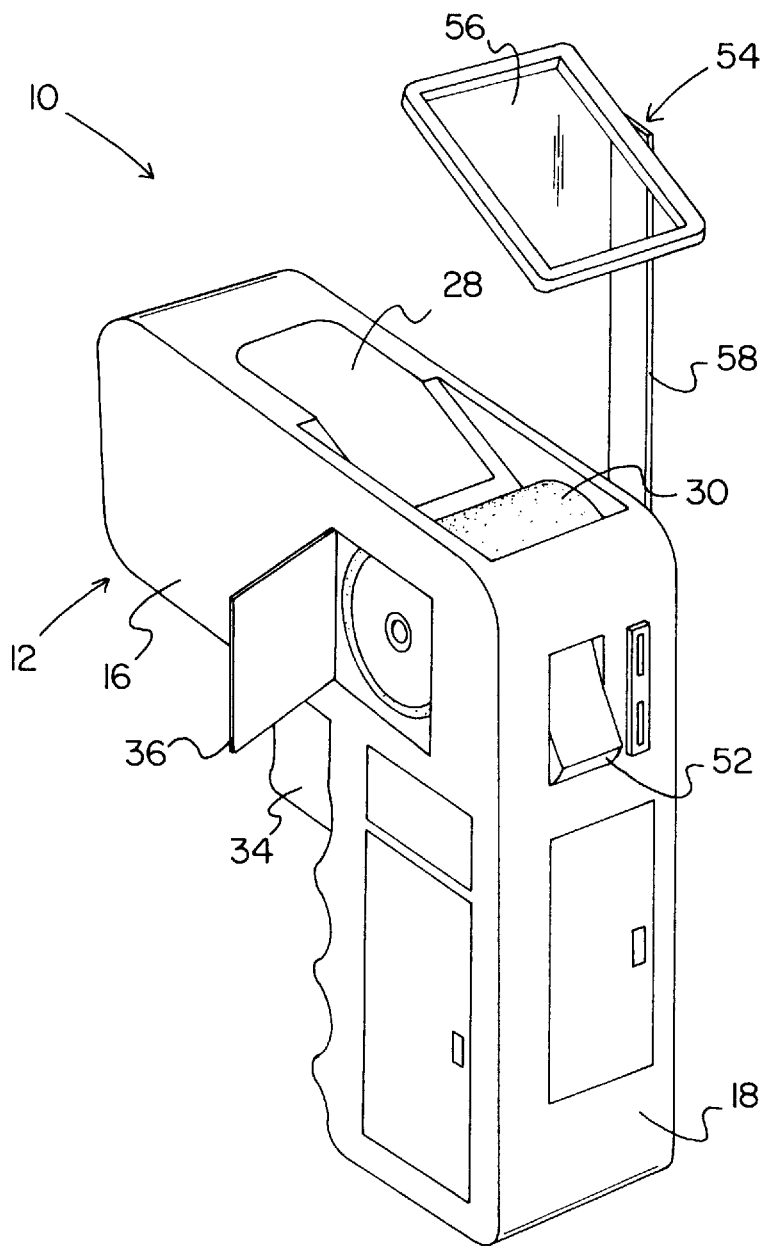
FIG. 5 is a schematic perspective view of the present invention.

With reference now to the drawings, and in particular to FIGS. 1 through 5 thereof, a new animal nail filing device embodying the principles and concepts of the present invention and generally designated by the reference numeral 10 will be described.

As best illustrated in FIGS. 1 through 5, the animal nail filing device 10 generally comprises a housing 12 having an interior 14, a main portion 16, and a handle portion 18. The main portion 16 has a generally flat top 20 and proximal and distal ends 22,24. The top 20 has an opening 26 into the interior 14 of the housing 12 and is positioned towards the proximal end 22 of the main portion 16. A grinding drum 30 with an abrasive exterior surface for grinding the nail of an animal is rotatably mounted within the interior 14 of the housing 12. The grinding drum 30 is positioned within the main portion 16 so that it is located adjacent the opening 26 of the top 20 of the main portion 16 such that a nail of an animal may be extended through the opening 26 to abut the abrasive exterior surface of the grinding drum 30. A motor 32 is provided within the interior 14 of the housing, the motor 32 is operative connected to the grinding drum 30 to permit rotation of the grinding drum 30 by the motor 32. The handle portion 18 has a trigger actuator switch 34 that is operatively connected to the motor 32.

The nail filing device 10 is designed for filing the nails of an animal. Specifically, the housing 12 is generally L-shaped and has an interior 14, a main portion 16, and a handle portion 18. The main portion 16 has a generally flat top 20 and proximal and distal ends 22,24. The top 20 of the main portion 16 has an generally rectangular opening 26 into the interior 14 of the housing 12. The opening 26 is positioned towards the proximal end 22 of the main portion 16. Preferably, the top 20 of the main portion 16 has a cushion 28, ideally made of a non-skid material such as rubber, for resting a paw of an animal thereon. The cushion 28 is located adjacent the opening 26 of the top 20 of the main portion 16 and is interposed between the opening 26 of the top 20 of the main portion 16 and the distal end 24 of the main portion 16.

The grinding drum 30 is generally cylindrical has an abrasive exterior surface for grinding the nail of an animal. The grinding drum 30 is rotatably mounted within the interior 14 of the housing 12 to permit rotation of the abrasive exterior surface of the grinding drum 30. The grinding drum 30 is positioned within the main portion 16 so that the grinding drum 30 is located adjacent the opening 26 of the top 20 of the main portion 16. This permits extension of a nail through the opening 26 of the top 20 of the main portion 16 to abut the abrasive exterior surface of the grinding drum 30. Ideally, the main portion 16 has an access opening into the interior 14 of the housing 12 with a closable access panel 36. The access opening 36 is located adjacent the grinding drum 30 to permit easy removal and replacement of the grinding drum 30 through the access opening 36.

Preferably, a nail lever 40 is disposed within the opening 26 of the top 20 of the main portion 16. The nail lever 40 is extended from the edge of the opening closest the distal end 24 of the main portion 16 towards the grinding drum 30. The nail lever 40 is pivotally coupled to the main portion 16 such that the nail lever 40 may be pivoted towards and away from the grinding drum 30. Ideally, the nail lever 40 is pivotable to a position where the nail lever 40 is planar with the top 20 of the main body 16. The nail lever 40 is biased away from the grinding drum 30 by a spring 42 provided within the interior 14 of the housing 12.

The motor 32 is provided within the interior 14 of the housing 12 and is operative connected by gears 38 to the grinding drum 30 to permit rotation of the grinding drum 30 by the motor 32 when powered. Preferably, the motor 32 is located within the main portion 16.

The handle portion 18 is downwardly extended from the main portion 16 and preferably located towards the proximal end 22 of the main portion 16. The handle portion has a trigger actuator switch 34 is operatively connected to the motor 32 to permit selective powering of the motor 32. A power source 44 is operative connected to the motor 32, to provide power to the motor 32. Preferably, the power source 44 is provided within the interior 14 of the housing 12 and located within the handle portion 18. Ideally, the power source 44 is a battery. In the preferred embodiment of the invention, the handle portion 18 has an battery access opening adjacent the power source 44 which is closable by a battery access door 46.

Ideally, the handle portion 18 also includes has a storage compartment 48 (with a closable storage compartment door) within the interior 14 of the housing 12, the storage compartment 48 is sized to permit the storage of at least one grinding drum 30 therein.

In the ideal embodiment of the invention, a speed controller actuator 50 is provided on the housing 12 for controlling the speed of rotation of the grinding drum 30 by the motor 32. The speed controller actuator 50 is operatively connected to the motor 32 and preferably located towards the proximal end 22 of the main portion 16. A main power switch 52 is also operative connected to the motor 32 and provided on the housing 12 towards the proximal end 22 of the main portion 16.

Preferably, an eye protector member 54 is also included on the animal nail filing device 10. The eye protector member 54 includes a transparent magnifying pane 56 pivotally coupled to one end of an elongate shaft 58. The eye protector member 54 is coupled to the housing 12 so that the transparent pane 56 is positioned above the opening 26 of the top 20 of the main portion 16. The shaft 58 is slidably mounted to the housing 12 to permit selective extension of the transparent pane away from (FIG. 1) and retraction towards (FIGS. 2,3, and 4) the opening 26 of the top 20 of main portion 16. The shaft 58 is retractable such that the transparent magnifying pane 56 may cover, or close, the opening 26 of the top 20 of the main portion 16. Ideally, a position lock 60 is provided on the housing 12 which is engagable to the shaft 58 to permit selective holding of the shaft 58 by the position lock 60 at various positions.

In use, the nail filing device 10 is designed for filing the nails of an animal. A user grasps the housing 12 by the handle portion 18 so that a finger may access the trigger actuator switch 34. A paw of an animal is then rested on the cushion 28 on the top 20 of the main portion 16 so that the nail may be extended through the opening 26 of the top 20 of the main portion 16 to abut the abrasive exterior surface of the grinding drum 30. The nail is rested on the nail lever 40. The nail on the nail lever 40 may then be pressed down to pivot the nail and the nail lever 40 towards the grinding drum 30. The trigger actuator switch 34 is then actuated so that the motor 32 rotates the grinding drum 30 to file the nail.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A nail filing device for filing the nails of an animal, said nail filing device comprising:

a housing having an interior, a main portion, and a handle portion;

said main portion having a generally flat top and proximal and distal ends, said top of said main portion having an opening into said interior of said housing, said opening being positioned towards said proximal end of said main portion;

a grinding drum having an abrasive exterior surface for grinding the nail of an animal, said grinding drum being rotatably mounted within said interior of said housing, said grinding drum being positioned within said main portion, said grinding drum being located adjacent said opening of said top of said main portion such that a nail may be extended through said opening of said top of said main portion to abut said abrasive exterior surface of said grinding drum;

a motor being provided within said interior of said housing, said motor being operative connected to said grinding drum to permit rotation of said grinding drum by said motor; and said handle portion having a trigger actuator switch being operatively connected to said motor.

2. The device of claim 1, wherein said top of said main portion has a cushion for resting a paw of an animal thereon, said cushion being located adjacent said opening of said top of said main portion.

3. The device of claim 1, further comprising a nail lever being disposed within said opening of said top of said main portion, said nail lever being extended towards said grinding drum, said nail lever being pivotally coupled to said main portion such that said nail lever may be pivoted towards and away from said grinding drum, said nail lever being biased away from said grinding drum.

4. The device of claim 1, further comprising a power source being operative connected to said motor, said power source being provided within said interior of said housing, said power source being located within said handle portion.

5. The device of claim 4, wherein said power source is a battery.

6. The device of claim 1, wherein said handle portion has a storage compartment within said interior of said housing, said storage compartment being sized to permit the storage of at least one grinding drum therein.

7. The device of claim 1, further comprising a speed controller actuator for controlling the speed of rotation of said grinding drum by said motor, said speed controller actuator being operatively connected to said motor, said speed controller actuator being provided on said housing.

8. The device of claim 1, further comprising an eye protector member having a transparent magnifying pane and an elongate shaft, said transparent pane being positioned above said opening of said top of said main portion, said shaft being slidably mounted to said housing to permit extension of said transparent pane away from and towards said opening of said top of main portion.

9. A nail filing device for filing the nails of an animal, said nail filing device comprising:

a housing being generally L-shaped and having an interior, a main portion, and a handle portion;

said main portion having a generally flat top and proximal and distal ends, said top of said main portion having an opening into said interior of said housing, said opening being positioned towards said proximal end of said main portion, said top of said main portion having a cushion for resting a paw of an animal thereon, said cushion being located adjacent said opening of said top of said main portion;

a grinding drum having an abrasive exterior surface for grinding the nail of an animal, said grinding drum being rotatably mounted within said interior of said housing, said grinding drum being positioned within said main portion, said grinding drum being located adjacent said opening of said top of said main portion such that a nail may be extended through said opening of said top of said main portion to abut said abrasive exterior surface of said grinding drum;

a nail lever being disposed within said opening of said top of said main portion, said nail lever being extended towards said grinding drum, said nail lever being pivotally coupled to said main portion such that said nail lever may be pivoted towards and away from said grinding drum, said nail lever being biased away from said grinding drum;

a motor being provided within said interior of said housing, said motor being operative connected to said grinding drum to permit rotation of said grinding drum by said motor;

said handle portion having a trigger actuator switch being operatively connected to said motor;

a power source being operative connected to said motor, said power source being provided within said interior of said housing, said power source being located within said handle portion, wherein said power source is a battery;

said handle portion having a storage compartment within said interior of said housing, said storage compartment being sized to permit the storage of at least one grinding drum therein;

a speed controller actuator for controlling the speed of rotation of said grinding drum by said motor, said speed controller actuator being operatively connected to said motor, said speed controller actuator being provided on said housing; and an eye protector member having a transparent magnifying pane and an elongate shaft, said transparent pane being positioned above said opening of said top of said main portion, said shaft being slidably mounted to said housing to permit extension of said transparent pane away from and towards said opening of said top of main portion.

* * * * *